(12) United States Patent
Garcia et al.

(10) Patent No.: US 11,032,302 B2
(45) Date of Patent: Jun. 8, 2021

(54) TRAFFIC ANOMALY DETECTION FOR IOT DEVICES IN FIELD AREA NETWORK

(71) Applicant: Vencore Labs, Inc., Basking Ridge, NJ (US)

(72) Inventors: Federico Jose Garcia, Red Bank, NJ (US); Aditya Naidu, Basking Ridge, NJ (US); Stanley Pietrowicz, Red Bank, NJ (US)

(73) Assignee: PERSPECTA LABS INC., Basking Ridge, NJ (US)

( * ) Notice: Subject to any disclaimer, the term of this patent is extended or adjusted under 35 U.S.C. 154(b) by 236 days.

(21) Appl. No.: 16/049,139

(22) Filed: Jul. 30, 2018

(65) Prior Publication Data

US 2019/0036954 A1     Jan. 31, 2019

Related U.S. Application Data

(60) Provisional application No. 62/539,223, filed on Jul. 31, 2017.

(51) Int. Cl.
*H04L 29/06*     (2006.01)
*H04W 12/08*     (2021.01)
(Continued)

(52) U.S. Cl.
CPC ........ *H04L 63/1425* (2013.01); *H04L 63/101* (2013.01); *H04L 63/1408* (2013.01);
(Continued)

(58) Field of Classification Search
USPC .......................................... 726/23
See application file for complete search history.

(56) References Cited

U.S. PATENT DOCUMENTS 9,110,101 B2   8/2015   Pietrowicz et al.
9,130,982 B2   9/2015   Gottlieb et al.
(Continued)

FOREIGN PATENT DOCUMENTS

JP     5363660 B2 * 12/2013 ............ H04W 24/10
JP     5363660 B2    12/2013
(Continued)

OTHER PUBLICATIONS

PAIR Assignment Information Report, U.S. Appl. No. 16/049,139, filed Jul. 30, 2018, generated Apr. 19, 2021.
(Continued)

*Primary Examiner* — Eleni A Shiferaw
*Assistant Examiner* — Sakinah White Taylor
(74) *Attorney, Agent, or Firm* — Hye Jin Lucy Song; Heslin Rothenberg Farley & Mesiti PC

(57) ABSTRACT

A method, computer system, and computer program product that generates a whitelist for each subject device in a field area network (FAN). The whitelist includes one or more whitelist entries corresponding to one or more peer devices in the same FAN communicating with the subject device. Each whitelist entry includes one or more attribute values expected in respective traffic between the subject device and each peer device that is represented by a respective whitelist entry. The traffic in the FAN is monitored at one or more points of the FAN for anomaly by use of the whitelist.

20 Claims, 10 Drawing Sheets

(51) Int. Cl.
  *H04W 12/121*  (2021.01)
  *G06F 16/22*   (2019.01)
  *H04W 4/70*    (2018.01)
  *H04L 29/08*   (2006.01)

(52) U.S. Cl.
  CPC .......... *H04L 63/1416* (2013.01); *H04L 63/20* (2013.01); *H04W 12/08* (2013.01); *H04W 12/121* (2021.01); *G06F 16/22* (2019.01); *H04L 67/12* (2013.01); *H04W 4/70* (2018.02)

(56) References Cited

U.S. PATENT DOCUMENTS

| | | | |
|---|---|---|---|
| 9,667,521 B2 | 5/2017 | Pietrowicz et al. | |
| 2013/0227689 A1* | 8/2013 | Pietrowicz | G01R 21/00 726/23 |
| 2016/0028762 A1* | 1/2016 | Di Pietro | G06F 21/55 726/23 |
| 2016/0028763 A1* | 1/2016 | Cruz Mota | H04L 63/1458 726/23 |
| 2017/0149639 A1* | 5/2017 | Vasseur | H04L 12/44 |
| 2017/0353446 A1* | 12/2017 | Wetterwald | H04L 67/12 |

FOREIGN PATENT DOCUMENTS

| | | | |
|---|---|---|---|
| JP | 5450588 B2 * | 3/2014 | ............ H04W 48/16 |
| JP | 5450588 B2 | 3/2014 | |

OTHER PUBLICATIONS

Global Dossier Report, U.S. Appl. No. 16/049,139, dated Jul. 30, 2018, generated Apr. 22, 2021.

PAIR Continuity Report, U.S. Appl. No. 16/049,139, dated Jul. 30, 2018, generated Apr. 22, 2021.

Chen, Yingying, et al., "Detecting and Localizing Wireless Spoofing Attacks" [retrieved on Jul. 31, 2017]. Retrieved from the Internet URL: <https://www.cs.rutgers.edu/~rmartin/papers/spoofing-secon-2007.pdf>, 2007 4th Annual IEEE Communications Society Conference on Sensor, Mesh and Ad Hoc Communications and Networks, Jun. 18-21, 2007, 10 pgs.

Wright, Joshua, "Detecting Wireless LAN MAC Address Spoofing" [retrieved on Jul. 31, 2017]. Retrieved from the Internet URL: <https://pdfs.semanticscholar.org/6b87/cefaaa650b910591e7ee9afbddf4158cbffa.pdf>, Jan. 21, 2003, 20 pgs.

* cited by examiner

TRAFFIC ANOMALY DETECTION FOR IOT DEVICES IN FIELD AREA NETWORK

FIELD OF INVENTION

The present disclosure relates to systems and methods of network security in a Field Area Network (FAN), and particularly relates to detection of anomalies in the behaviors of devices of a FAN by use of Layer 2 traffic.

BACKGROUND OF INVENTION

Detecting anomalies in node behavior and traffic in a Field Area Network (FAN) is particularly challenging because there are numerous devices located over a large geographical area. Devices in a FAN rely upon one another to form a network typically using wireless technologies whose signals have no well controlled perimeter or wired technologies on non-dedicated physical mediums. FANs do not have a single point in the network to observe the majority of traffic as radio range create limited ability to hear nodes at a distance. Accordingly, traditional perimeter security control mechanisms depending on ingress points for a network signal such as network firewalls are not viable in FANs. Further, many FANs having multitudinous devices of many types that are governed by distinct communication policies may geographically overlap. The widely distributed nature and size of FANs, the inability to prevent an adversary from gaining physical access to the network medium, and the difficulty of physically secure devices, make FANs more vulnerable to cyberattack and physical tampering than networks contained within electronically and physically protected perimeters. As FANs are utilized for civil infrastructure that includes metering, streetlight control, distribution automation, load control, sensor reporting, and intelligent transportation as well as industrial infrastructure for oil/gas/mineral rigs, pipelines, mining/extraction, and smart farming, detection of activity that threatens the security and integrity of the FANs is necessary to protect revenue, to maintain public and worker safety, and to prevent civil disruption.

SUMMARY OF INVENTION

Shortcomings of the prior art are overcome and additional advantages are provided through the provision of a method for detecting a traffic anomaly in FANs. The method includes, for instance: generating a whitelist for a subject device in a field area network (FAN) listing one or more peer devices in the same FAN communicating with the subject device as respective whitelist entries, where a whitelist entry corresponds to a peer device of the one or more peer devices and includes one or more attribute values expected in traffic between the subject device and the peer device as represented by the whitelist entry; and monitoring the traffic at one or more points of the FAN by use of the whitelist for one or more anomaly.

Systems and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application.

Conventional methods for detecting anomalies in data traffic of a Field Area Network (FAN) having numerous Internet of Things (IoT) devices utilize traffic data from the Network Layer (Layer 3), the Transport Layer (Layer 4) or upper layers in the seven-layer Open Systems Interconnection (OSI) model. The Internet Protocol (IP) and the Transport Control Protocol (TCP) of the TCP/IP protocol architecture, which is a standard protocol suite for most of network communications, respectively corresponds to Layer 3 and Layer 4 of the OSI model. Because outgoing data traffic from Layer 3 or upper layers may be encapsulated in data packets in the Data Link Layer (Layer 2) of the OSI model, authentication and integrity measures implemented in Layer 3 or upper layers may not check anomalies in Layer 2 data traffic. Further, some traffic in FANs do not contain Layer 3 and above payloads, but exists only at the lower layers. Accordingly, there is a need to detect anomalous data traffic in Layer 2 such that integrity of the FAN operations may be assured.

Certain embodiments of the present invention detect anomalies in behaviors of IoT devices in a FAN by use of Layer 2 traffic data, particularly the source or destination Medium Access Control (MAC) address of each packet, either explicitly provided or inferred by means of channel, preceding packets or cyclic redundancy check (CRC) calculation with inserted address. Numerous observations are made by use of FAN monitoring system such as SecureSmart™, and anomalies are detected based on the observations of traffic patterns at each layer, including Layer 2. (SecureSmart is a trademark of Vencore Labs in the United States and/or other countries.)

Figure 1:
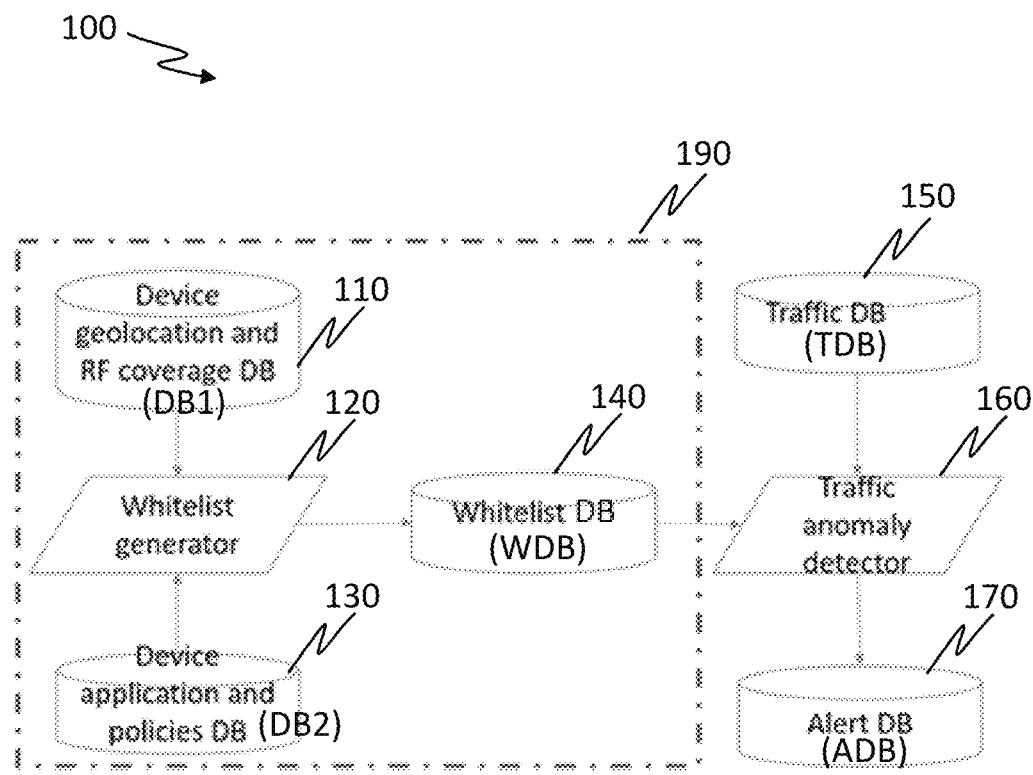
FIG. 1 depicts a technical architecture of a system for traffic anomaly detection that demonstrates aspects of one or more embodiment of the present invention.

FIG. 1 depicts a technical architecture of a system 100 for traffic anomaly detection that demonstrates aspects of an embodiment of the present invention.

The system 100 for detecting traffic anomalies in Layer 2 packets indicative of a compromised IoT device includes a device geolocation and radio frequency (RF) coverage database (DB1) 110, a whitelist generator 120, a device application and policies database (DB2) 130, a whitelist database (WDB) 140, a traffic database (TDB) 150, a traffic anomaly detector 160, and an alert database (ADB) 170. The system 100 monitors a Field Area Network (FAN), coupling numerous devices of various types and with distinctive functionalities such as an IoT device, a field device, etc., over a vast geographical area up to a few thousands of square miles. The system 100 may monitor the FAN that is implemented as a wireless or a wired network. Various examples of wireless FANs that are presently available include, but are not limited to, IEEE 802.15.4g/e networks, ZigBee Alliance JupiterMesh, L+G GridStream, Wi-SUN Alliance FAN, Ingenu, Sigfox, etc. An example of wired FAN may include a power line carrier (PLC) network.

The system 100 monitors various types of data including, but not limited to geolocation data of numerous types of devices associated with fixed locations in the FAN, estimated radio coverage maps of the IoT devices, and device application and policies database. In order to detect Layer 2 traffic anomalies, the system 100 utilizes packet traffic patterns known to be associated with respective types of anomalies, including movement with the devices, device cloning, MAC address spoofing, etc., as well as patterns defined by operator policy about device behavior. The system 100 stores respective types of monitored data in corresponding databases from the DB1 110, the DB2, 130, the WDB 140, and the TDB 150, according to respective types of the data.

The device geolocation and RF coverage database (DB1) 110 stores the geolocations of the devices as well as respective RF coverage map for the devices. The radio coverages of respective IoT devices may be estimated by radio propagation loss modeling based on characteristics of the radio waves used by the respective IoT devices, information on local terrain, elevation levels of the respective device, transmit power of the device, antenna direction, etc. An example of a RF coverage area for an IoT device estimated by use of a radio frequency propagation loss model is presented in FIG. 4A and corresponding description.

The device application and policies database (DB2) 130 stores respective mappings of devices to applications deployed on the respective devices and information on policies governing traffic flows between subnets of the FAN. The applications on the devices dictate respective types, periodicities, and directionalities of traffic to and/or from the applications as being expected as normal operations of the respective devices. Examples of directionalities with the traffic may be inbound only, outbound only, bidirectional, etc. The periodicities with the traffic indicate how often and how much traffic would be caused by the normal operations of certain applications on the device, and may be represented in numeric ranges with thresholds. The policies governing traffic flows may be, for example, a rule/policy not permitting any traffic between the Supervisory Control and Data Acquisition (SCADA) and Advanced Metering Infrastructure (AMI) sub-networks of the larger utility network except between designated gateways or separation of traffic based upon logical virtual networks.

The whitelist database (WDB) 140 stores one or more whitelists corresponding to respective devices of the FAN, as generated by the whitelist generator 120. The whitelist generator 120 utilizes inputs from the DB1 110 and the DB2 130 in generating the whitelists per device. Details on operations of the whitelist generator 120 are presented in FIG. 2 and corresponding descriptions.

In the WDB 140, a whitelist of a subject device enumerates peer devices with which the subject device may normally communicate based on input values associated with the subject device and the peer devices. Each one of the peer devices corresponds to an entry in the whitelist of the subject device. The whitelist entry may corresponds to a group of peer devices in case where the subject device broadcasts to the group of peer devices. The whitelist entry corresponding to a first peer device may include attributes of: a device identifier (ID) of the first peer device; a directionality of expected communication between the subject device and the first peer device, a periodicity of the expected communication indicating how often and for how long the subject device and the first peer device communicates, an expected traffic volume, the type of traffic and other characteristics of expected traffic.

A whitelist preparation block 190 of the system 100 includes processing and populating the DB1 110 and the DB2 130, and the whitelist generator 120. The whitelist generator 120 utilizes inputs including, but not limited to, device geolocations for IoT devices in the FAN, respective RF coverage maps for the IoT devices, respective applications and use policies for the IoT devices, as obtained from the DB1 110 and the DB2 130, and as a result, produces one or more whitelist respective to each device of the FAN and stores the generated whitelist in the WDB 140. The whitelist generator 120 may perform updates to initialize the WDB 140 or to maintain the whitelists stored in the WDB 140 up-to-date according to changes of the inputs. As the system 100 monitors the FAN during normal operation, there may be legitimate changes in the device status because devices/applications may be newly installed, retiring, replaced, and/or redeployed. Accordingly, the whitelist generator 120 may need to refresh the whitelists in the WDB 140. The whitelist generator 120 may be configured to run periodically as in a daily whitelist update, and/or dynamically upon being triggered by the device status changes in the FAN. The whitelist may also define attributes that are based upon the time of day, where interactions among certain nodes are expected during some periods but not all. Details on operations of the whitelist preparation block 190 are presented in FIG. 3 and corresponding descriptions.

The WDB 140 stores whitelists respective to all IoT devices in the FAN, such that the traffic anomaly detector 160 may utilize the whitelists stored in the WDB 140 in comparing with actual data traffic.

Content of the TDB 150 is a collection of actual traffic in the FAN such as a packet capture file in .pcap format, which is commonly used in computer network administration applications for monitoring network traffic. An example of the computer network administration application may be SecureSmart network security solution for smart grids, etc. The traffic data between the devices of the FAN may be monitored by a monitoring system for analysis. The traffic analysis may be performed in real time or in offline mode, in which the monitoring system analyzes previously captured traffic files in order to check for conditions indicative of anomalous behavior on the monitored device. An example of the monitoring system may be SecureSmart, etc.

The traffic anomaly detector 160 detects Layer 2 traffic anomalies by use of the whitelists stored in the WDB 140 and traffic data from the TDB 150. The traffic anomaly detector 160 compares the traffic data from the TDB 150 with attribute instances stored in the whitelists from the WDB 140 as expected from normal traffic, in order to detect traffic anomaly. When a discrepancy suspicious of traffic anomaly is discovered, the traffic anomaly detector 160 flags the traffic data as anomalous and stores in the alert database (ADB) 170 such that preconfigured action for traffic anomaly may be taken. Details on operations of the traffic anomaly detector 160 are presented in FIG. 5 and corresponding descriptions.

In certain embodiments of the present invention, the system 100 may be implemented in a central server such that devices that are already deployed need no changes for traffic anomaly detection in the devices, but will need probes to capture and to send device traffic to the central server or an agent within the devices being monitored to report traffic. In other embodiments of the present invention, the system 100 may be implemented within the probes or respective devices with proper processing capacity and network bandwidth such that the system 100 may be practiced in a distributed manner.

Figure 2:
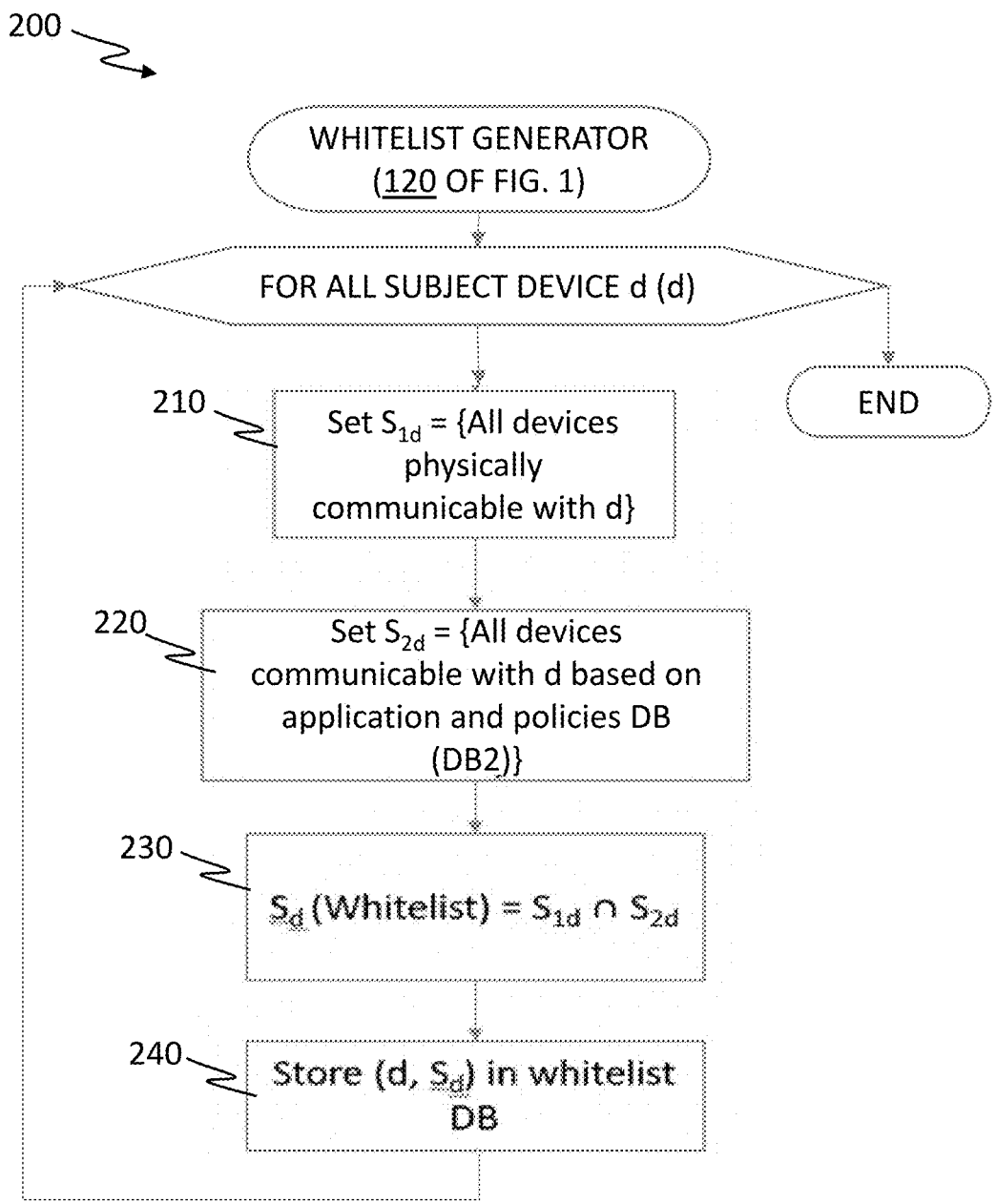
FIG. 2 depicts a flowchart for the whitelist generator of the system, in accordance with one or more embodiment of the present invention.

FIG. 2 depicts a flowchart 200 for the whitelist generator 120 of FIG. 1, in accordance with one or more embodiment of the present invention.

The whitelist generator 120 performs blocks 210 through 240 as a unit per each device of one or more subject device in the FAN. The whitelist generator 120 generates a whitelist corresponding to a current device d in blocks 210 through 240.

In block 210, the whitelist generator 120 specifies a first set of devices including all devices that are physically communicable with the current device d. Communication between devices is physically enabled by use of, for example, a wireless radio network, a wired power line carrier (PLC) network, etc. The current device d can communicate with any devices within the radio coverage of the wireless radio network. The current device d can also communicate with other devices physically coupled to a wired network. Then the whitelist generator 120 proceeds with block 220.

In block 220, the whitelist generator 120 specifies a second set of devices that may communicate with the current device d, based on applications running on the current device d as well as policies governing communication of the current device d as stored in the DB2 130. Then the whitelist generator 120 proceeds with block 230.

In block 230, the whitelist generator 120 generates a whitelist for the current device d, listing devices from an intersection of the first set and the second set, as specified from blocks 210 and 220, respectively. In one embodiment of the present invention, each whitelist entry corresponding to each device in the whitelist for the current device d includes a device identifier, a directionality, a periodicity, time period, logical channel, frequency band or channel, traffic type and a traffic volume, indicating communication attributes expected from normal communication between the current device d and each device. Then the whitelist generator 120 proceeds with block 240.

In block 240, the whitelist generator 120 stores the whitelist of the current device d in the WDB 140, as being locatable by identifying the current device d. Then the whitelist generator 120 loops back to block 210 in order to generate another whitelist for any other device of which whitelist has not been generated and/or updated yet. If whitelists for all devices are generated and/or updated, the whitelist generator 120 terminates processing. The whitelist generator 120 may run periodically as configured for the system 100, and/or upon being invoked by the whitelist preparation block 190 as contents of the DB1 110 or the DB2 130 has been changed, as shown in FIG. 3.

Figure 3:
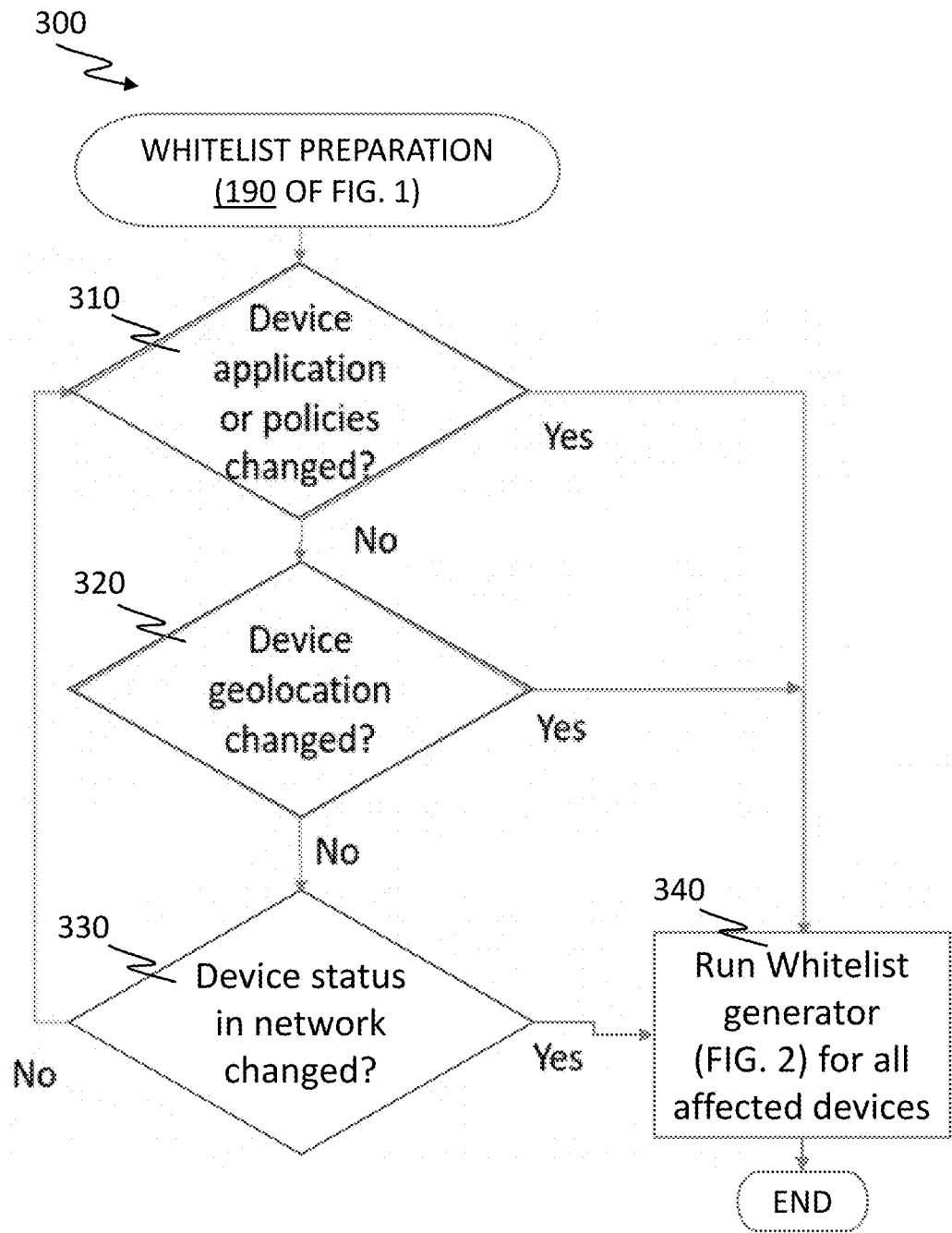
FIG. 3 depicts a flowchart for when the whitelist database needs to be (re)generated for the traffic anomaly detector, in accordance with one or more embodiment of the present invention.

FIG. 3 depicts a flowchart 300 for when to prepare the whitelist DB 140 for the traffic anomaly detector 160 of FIG. 1, in accordance with one or more embodiment of the present invention.

The system 100 may run the whitelist preparation block 190 to initialize all whitelists in the WDB 140 for the first time. While operating the system 100 for detecting traffic anomaly, the system 100 may run the whitelist preparation block 190 according to the configuration of the system 100, either periodically or upon being triggered by any changes affecting the whitelists. The whitelist preparation block 190 specifies when the whitelist DB 140 should be refreshed because a device count indicating the number of devices in the FAN, device locations, applications on the devices, communication policies governing the devices may change over time due to normal operations of the FAN, such that the traffic anomaly detector 160 may rely on the WDB 140 as being up-to-date and accurate.

In block 310, the system 100 determines if any applications running on one or more device or policies governing any devices has been changed, as reflected in the DB2 130. If the system 100 determines that any applications or policies have changed, then the system 100 proceeds to block 340. If the system 100 determines that the applications or policies has not changed, then the system 100 proceeds to block 320.

In block 320, the system 100 determines if any locations of the devices has been changed, as reflected in the DB1 110. If the system 100 determines that one or more device has changed respective location, then the system 100 proceeds to block 340. If the system 100 determines that the device location has not changed, then the system 100 proceeds to block 330.

In block 330, the system 100 determines if any new device has been introduced to the FAN or removed from the FAN. If the system 100 determines that the device status has changed, then the system 100 proceeds to block 340. If the system 100 determines that the device status has not changed, then the system 100 loops back to block 310.

In block 340, the system 100 invokes the whitelist generator 120, of which operations are presented in the flowchart 200 of FIG. 2. Then the system 100 terminates the whitelist preparation block 190.

Figure 4A:
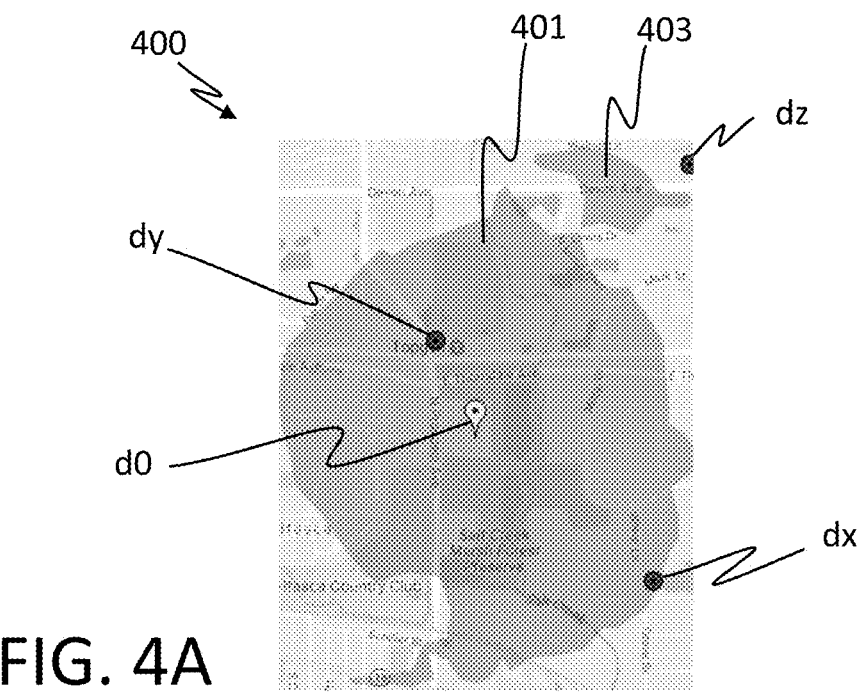
FIGS. 4A and 4B illustrate an example of a field area network and a base IoT device topology upon which one or more embodiment of the present invention related to Layer 2 traffic anomaly detection may be implemented.
Figure 4B:
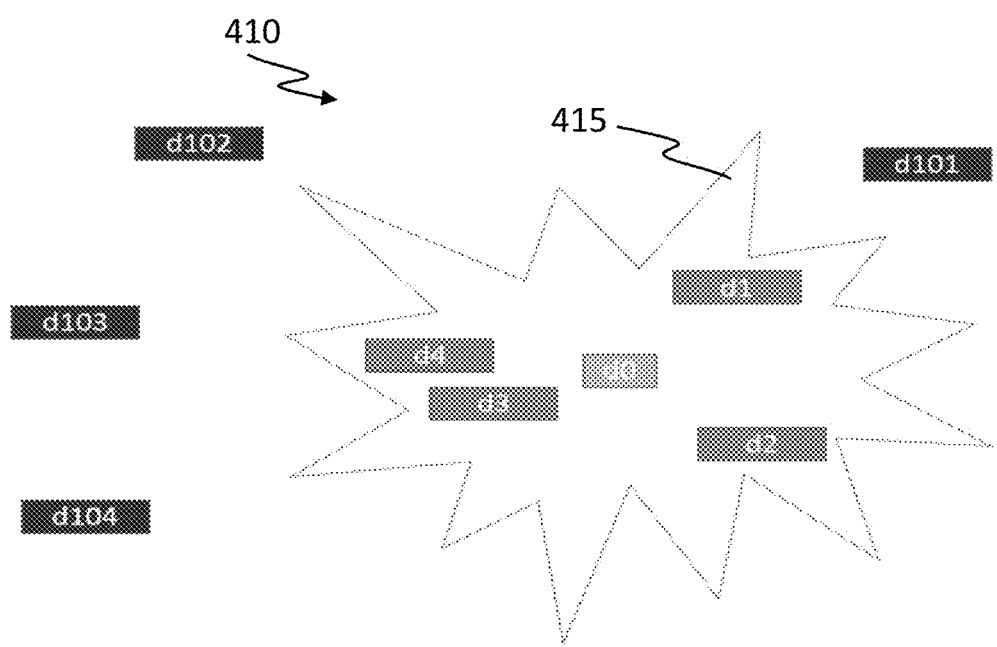

FIG. 4A illustrates an exemplary map 400 of RF coverage of a device d0 in a FAN, in accordance with one or more embodiments of the present invention. FIG. 4B depicts an exemplary base network 410 for the device d0, in accordance with one or more embodiment of the present invention.

In FIG. 4A, the exemplary map 400 includes two geographical areas 401, 403, indicating the RF coverage of the device d0. The RF coverage of the device d0 is not limited to a continuous geographical area, due to terrain of the area, buildings, elevations, and other geographical and artificial features within the RF coverage. In certain embodiments of the present invention, the RF coverage for a device may be estimated by use of a radio frequency propagation loss model. Certain applications such as SecureSmart MeshView for field devices, probes and Access Points (APs), include propagation loss modeling functionalities such that respective RF coverage areas for the respective field devices may be estimated and compared to the actual coverages for probes and access points in the FANs.

A first device dx is located on the edge of a first area 401, and may or may not communicate with the device d0, corresponding to configuration of the RF coverage for the device d0. A second device dy is located within the first area 401, and may communicate with the device d0. A third device dz is not located in either the first area 401 or a second area 403, and may not communicate with the device d0 as being located outside of the RF coverage of the device d0.

In FIG. 4B, the exemplary base network 410 includes a RF coverage 415 of the device d0. Device d1, device d2, device d3, and device d4 are located within the RF coverage 415 of the device d0, and accordingly, are listed in the whitelist of the device d0 as the devices d1 through d4 may legitimately communicate with the device d0 during the normal operations of the FAN. Device d101, device d102, device d103, and device d104 are located outside of the RF coverage 415 of the device d0, not listed in the whitelist of the device d0 as the devices d101 through d104 may not communicate with the device d0. For each subject device, respective whitelist may include entries for other peer devices with which the respective subject device may legitimately communicate. Each device in the FAN, as in any network devices, has a unique media access control (MAC) address that is used for Layer 2 traffic communication either explicitly by inclusion in the packet or implicitly by virtue of a prior sequence of packets, channel, or CRC calculation. In this disclosure, a device dn may indicate an identifier dn and/or a MAC address of the device dn. The base network 410 is a basis of examples of Layer 2 traffic anomalies shown in FIGS. 6, 7, and 8, and corresponding descriptions.

The base network 410 is an instance of a wireless mesh network (WMN) formed amongst the devices d0, d1, d2, d3, and d4, which utilizes radio frequencies to communicate with one another. The devices d1, d2, d3, and d4 are configured to automatically communicate with other devices within the respective radio coverage, if the other device is authenticated. As the devices d1, d2, d3, and d4 are within the RF coverage 415 of the device d0, the devices d0 would form respective communication channels with the devices d1, d2, d3, and d4. Accordingly, when a certain device has been moved in and out of the RF coverage 415 of the device d0 without properly refreshing the databases, the device d0 may notice such movement as well as locate the moved device by use of triangulation based on the device geolocations as stored in the DB1 110 and actual traffic between the device d0 and the moved device. An example of detecting movement of a device is presented in FIG. 6 and corresponding description.

In certain embodiments of the present invention, the base network 410 may be a wired power line carrier (PLC) network, in which the devices d1, d2, d3, and d4 form a mesh network by use of wired connections in place of the RF coverage 415. Accordingly, the coverage of the PLC devices d1, d2, d3, and d4 in the mesh network may be modeled by an electrical system signal loss model based on signal loss ratios of components of the PLC network including the wire medium, transformers, etc.

Figure 5:
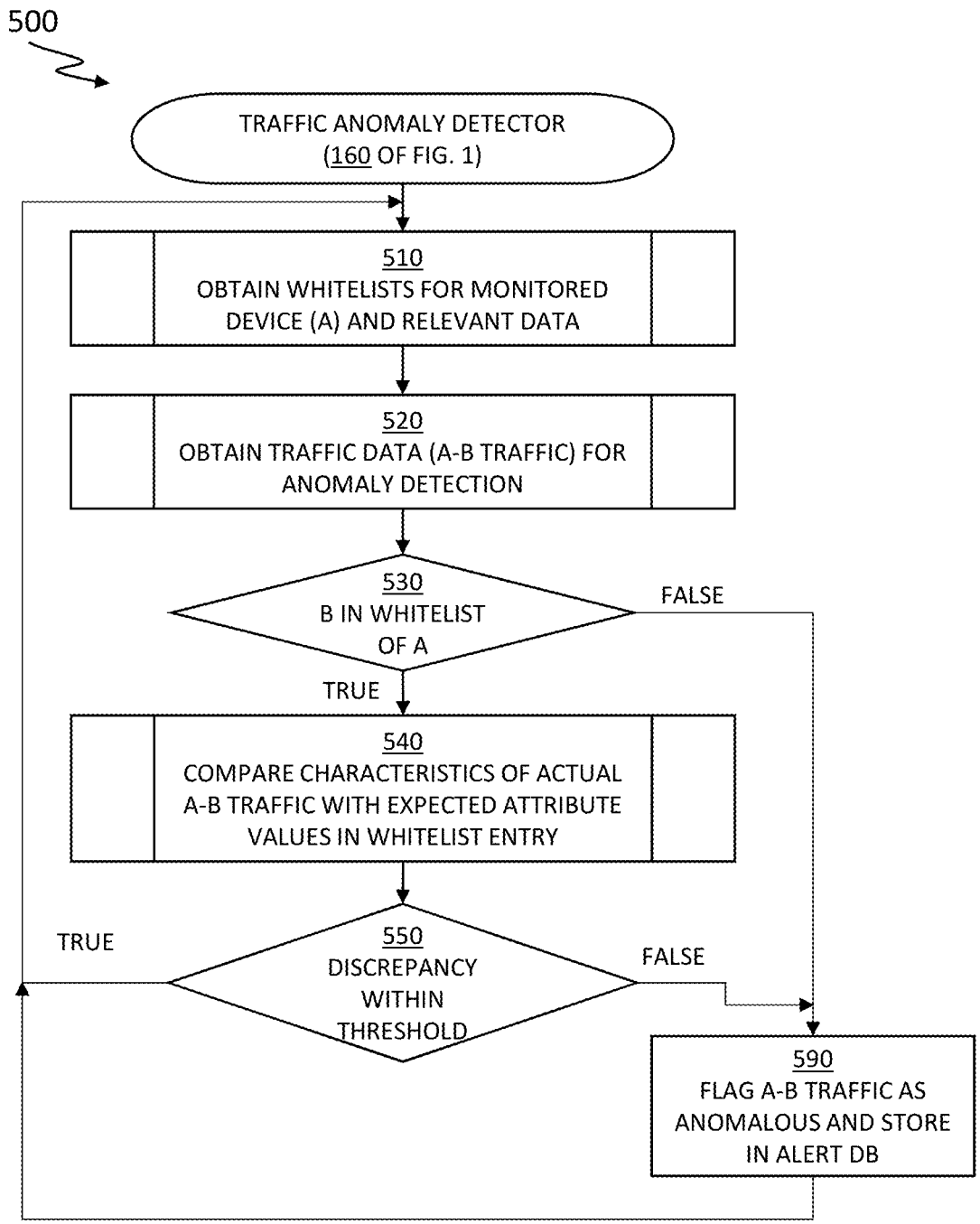
FIG. 5 depicts a flowchart for the traffic anomaly detector in the system, in accordance with one or more embodiment of the present invention.

FIG. 5 depicts a flowchart 500 for the traffic anomaly detector 160 in the system 100, in accordance with one or more embodiment of the present invention.

Prior to the traffic anomaly detector 160 begins monitoring, contents of the DB1 110, the DB2 130, and the WDB 140 are initially prepared and maintained up-to-date, as described in FIGS. 2 and 3, and corresponding descriptions. Blocks 510 through 590 represent elements for detecting anomaly and may be iterated in combinations as the DB1 110, the DB2 130, the WDB 140, and the TDB 150 are dynamically updated during the operations of the FAN.

In block 510, the traffic anomaly detector 160 obtains a whitelist for a monitored device (A) from the WDB 140. The configuration data of the device A including the RF coverage of the device A, applications running on the device A, policies governing communications between the device A and other devices in the whitelist, and geolocations respective all devices listed in the whitelist, are also obtained from the DB1 110 and the DB2 130. Then the traffic anomaly detector 160 proceeds with block 520.

In block 520, the traffic anomaly detector 160 obtains Layer 2 packet traffic between the monitored device A and a device B (A-B traffic) that communicates with the monitored device A in Layer 2. The A-B traffic is captured from actual network communication traffic in the RF coverage of the device A and stored in the traffic database (TDB) 150. In certain embodiments of the present invention, the traffic anomaly detector 160 may run on respective device and/or a centralized server, in order to monitor all traffic concurrently and sequentially, or in combinations thereof. Then the traffic anomaly detector 160 proceeds with block 530.

In block 530, the traffic anomaly detector 160 determines whether or not the device B communicating with the monitored device A has a corresponding entry in the whitelist of the device A. If the traffic anomaly detector 160 determines that device B has the corresponding entry in the whitelist of the device A, then the traffic anomaly detector 160 proceeds with block 540. If the traffic anomaly detector 160 determines that the device B is not represented in the whitelist of the device A, then the traffic anomaly detector 160 proceeds with block 590.

In block 540, the traffic anomaly detector 160 compares characteristics of the actual A-B traffic with corresponding attribute values configured in the whitelist entry for the device B. As presented above, the whitelist attribute values indicate expected behavior of actual traffic between devices A and B. The whitelist attributes in the entry for device B may include, but are not limited to, a directionality of the packet expected between A and B, a traffic volume as indicated by a number of packets expected between A and B, a periodicity of communication expected between A and B and/or the presence of communication between A and B, the packet type, etc. Then the traffic anomaly detector 160 proceeds with block 550.

In block 550, the traffic anomaly detector 160 determines if the actual A-B traffic shows any discrepancies greater than respective margins of error from the whitelist attribute values. The traffic anomaly detector 160 may have a pre-configured threshold for the discrepancies respective to the whitelist attribute values, in order to distinguish an anomaly from normal traffic with acceptable variations. If the traffic anomaly detector 160 determines that the discrepancy is acceptable and the actual A-B traffic may be deemed as normal, then the traffic anomaly detector 160 loops back to block 510 to continue with monitoring. If the traffic anomaly detector 160 determines that the actual A-B traffic deviates greater than the margins of error from the whitelist attribute values, then the traffic anomaly detector 160 proceeds with block 590.

Figure 6:
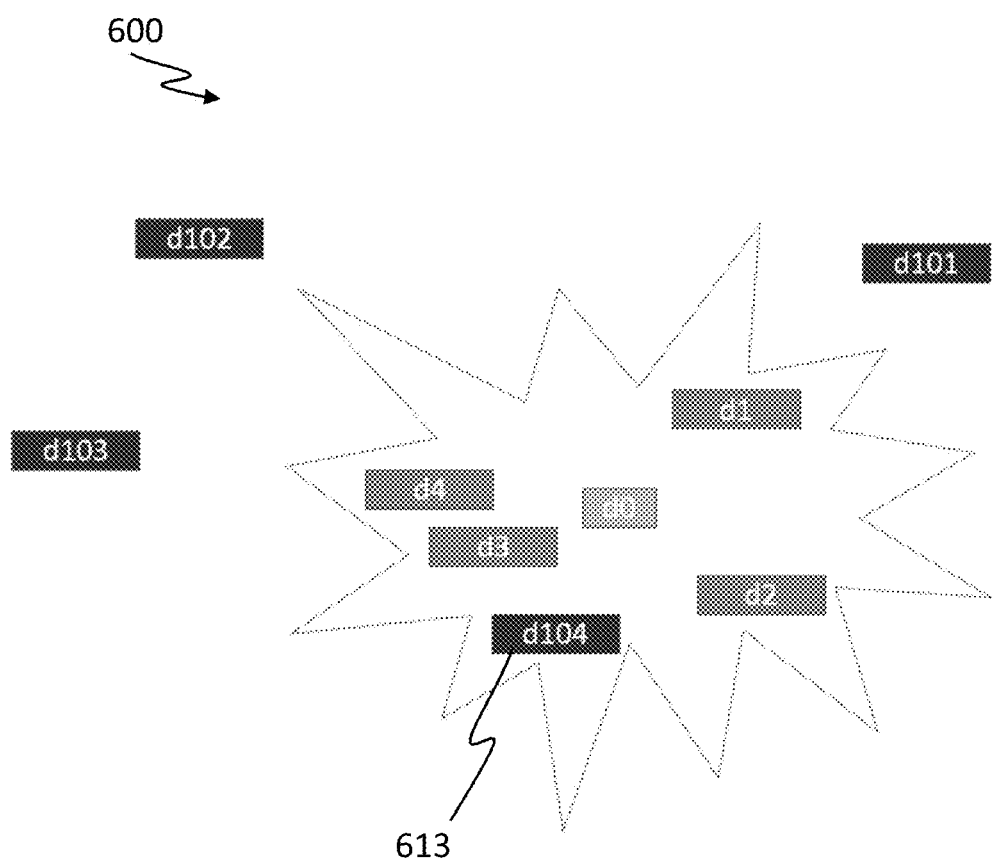
FIG. 6 depicts a first anomaly example in which a device has been moved, in accordance with one or more embodiment of the present invention.
Figure 7:
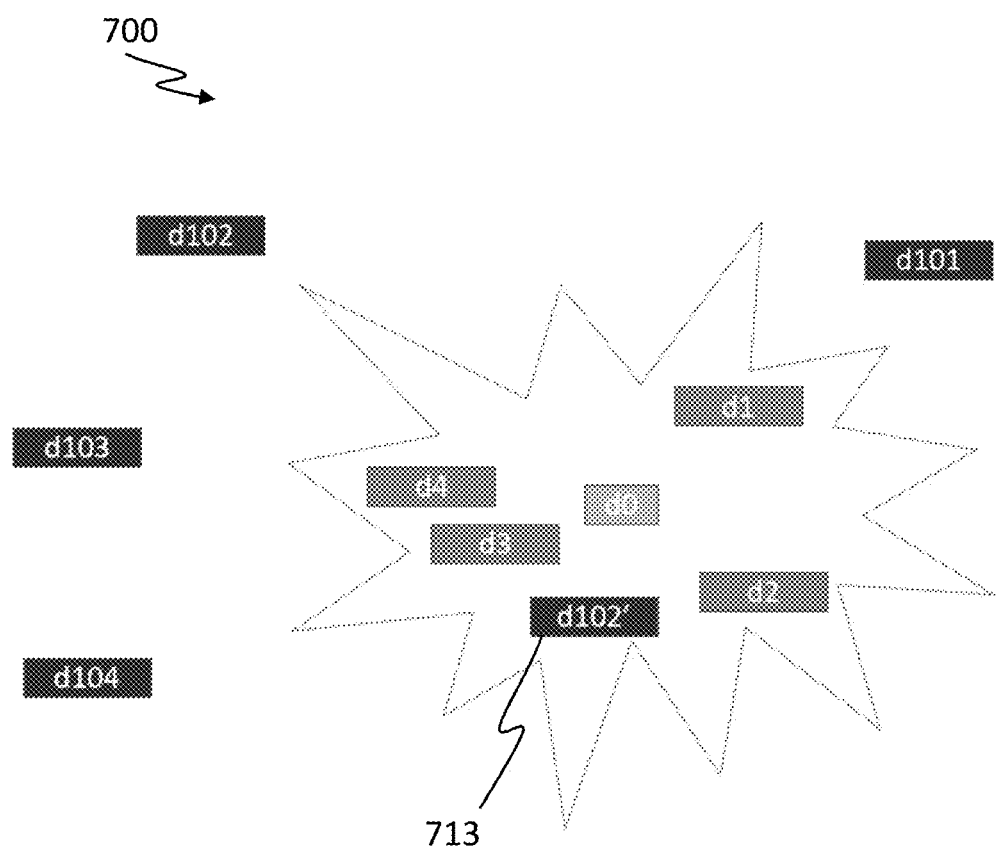
FIG. 7 depicts a second anomaly example in which a device has been cloned, in accordance with one or more embodiment of the present invention.
Figure 8:
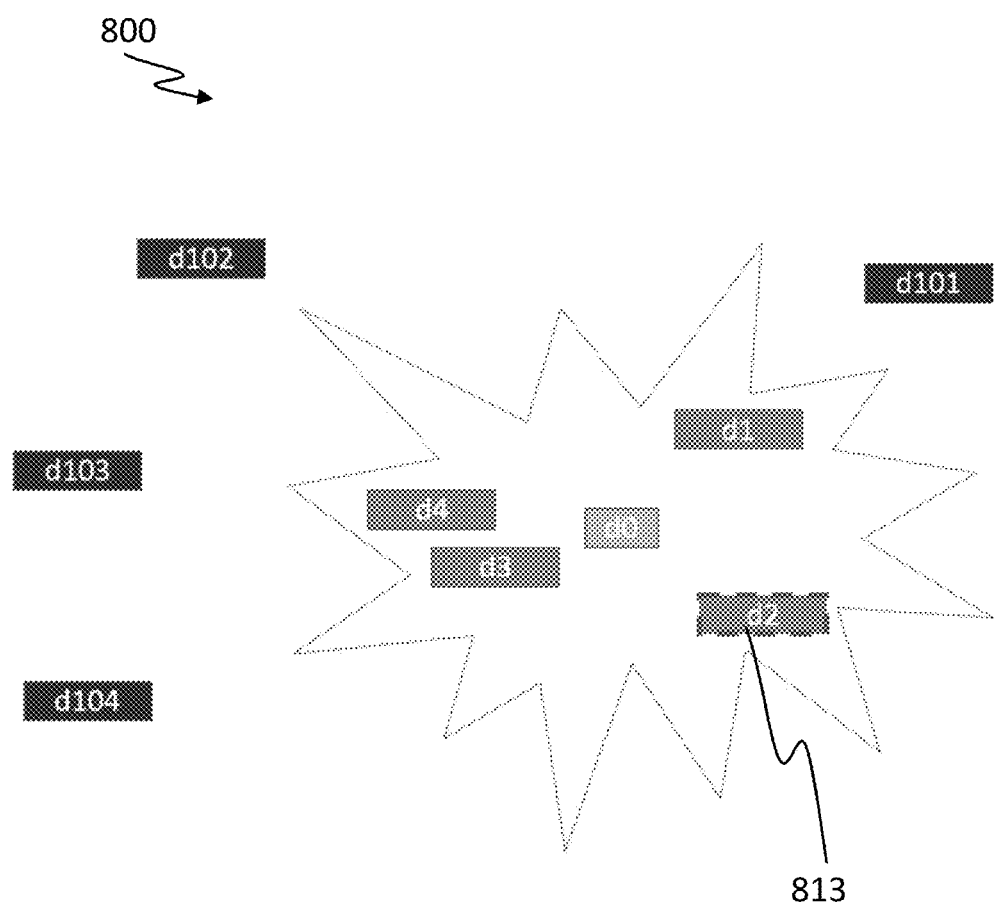
FIG. 8 depicts a third anomaly example in which a MAC address of a device has been spoofed, in accordance with one or more embodiment of the present invention.

A few examples of traffic anomalies are presented in FIGS. 6-8 and corresponding description. For another example, when the traffic anomaly detector 160 observes a device not communicating as expected with other devices in the whitelist of the device, or a device sending corrupted header and/or data, the traffic anomaly detector 160 may determine that the device has been tampered or malfunctioning and that a cross-network traffic has resulted. As several FANs may overlap, share borders, or within close proximity of respective RF coverage areas, and utilizes similar network technology, two (2) or more wireless networks operating close to one another may exchange signals/data, and misconfigured and/or malfunctioning devices may communicate with devices from other networks. Wherein devices from different networks communicate with one another and treat devices from another network as a part of a legitimate mesh network, such cross-network traffic causes the FAN a security risk, as well a potential performance problem. The traffic anomaly detector 160 may detect and shut down such cross-network traffic by use of the whitelists respective to devices.

In another example, the traffic anomaly detector 160 may further detect a malfunctioning or tampered device that communicates with other devices, regardless of entries in the whitelist of the device in an unexpected pattern or with corrupt packet header/data. The traffic anomaly detector 160 detects various other traffic anomalies including, no communication between devices wherein communication is expected, excessive communication as in too many node discovery packets, frequent device rebooting as advertised in node discovery packets, a pause in between normal communication streams, MAC addresses with unknown Organizationally Unique Identifiers (OUIs), incomplete MAC addresses in frame headers, unexpected traffic types, etc.

In block 590, the traffic anomaly detector 160 flags the A-B traffic as anomalous and stores the A-B traffic in the alert database (ADB) 170 such that the anomaly may be reported to a network administrator for a resolution in order to remove a suspicious device from the FAN, an analysis of the cause of the anomaly, etc. Then the traffic anomaly detector 160 loops back to block 510 to continue with monitoring other devices in the same RF range and/or other RF range for another subject device.

In certain embodiments of the present invention, the whitelist preparation block 190 may be configured to run concurrently with the traffic anomaly detector 500 and any updates in the WDB 140 may trigger a reset and repeat of the traffic anomaly detector 500 from block 510.

In certain embodiments from the present invention, the whitelist may be utilized to separate multiple wireless networks in overlapping geographical areas. For instance, utilities to deploy advanced metering infrastructure (AMI) and distribution applications (DA) often use the same wireless technology. DA applications are time sensitive and provisioned on a logical network separate from the AMI. Meters of the AMI should not communicate with DA devices because, during power interruptions, heavy AMI traffic may interfere with time sensitive DA system operation, and may result in delaying or failure to restore power to customers. The system 100 may generate whitelist per utility and per FAN such that devices may be properly separated with respect to the desired communications and such that anomalous traffic caused by device malfunction/device tempering may be readily detected.

FIGS. 6-8 illustrate examples of anomalous behaviors in Layer 2 traffic as detected from blocks 530 and 550 of FIG. 5 as performed by the traffic anomaly detector 160. As noted, the traffic anomaly detector 160 detects anomalous Layer 2 traffic by comparing expected attributes of traffic and actual traffic in the MAC layer.

FIG. 6 depicts a first anomaly example 600 in which a device has been moved outside of normal operations, in accordance with one or more embodiment of the present invention.

The first anomaly example 600 presents a scenario where the device d104 613 has been moved into the RF coverage for the subject device d0 from a previous location outside of the RF coverage 411 of the base network 410 of FIG. 4B. Accordingly, the subject device d0 begins communicating with the device d104 613, and the traffic anomaly detector 160 checks d0-d104 traffic. Because the device d104 does not have an entry in the whitelist of the subject device d0, the traffic anomaly detector 160 detects that the device d104 613 has been moved in block 530 of FIG. 5, and in block 590, flags the d0-d104 traffic as anomalous and stores the d0-d104 traffic in the ADB 170. Further, the device d104 613 may raise more than one alarm or record more than one anomalous traffic, because, when the traffic anomaly detector 160 runs for devices d1, d2, d3, and d4, respective whitelists of the devices d1, d2, d3, and d4 do not have any entry for the device d104 613.

The first anomaly example 600 indicating a movement of a device may be observed as the device communicating with several devices but respective whitelists of the communicating devices do not have any entry for the device. The first anomaly example 600 may occur where the device is stolen or otherwise moved without updating the geolocation data and the whitelist database in relevant databases.

In another embodiment of the present invention, the traffic anomaly detector 160 may use IPv6 address in an IPv6 Low-Power Wide-Area Network (LPWAN) in order to detect a movement of devices. The traffic anomaly detector 160 monitors the IPv6 address within the payload of Layer 2 frames as used by the devices in the communications between the devices. The IPv6 network prefix used by a device is often obtained from the Access Point (AP) to which it registers. A whitelist of network prefixes may be generated for each device based on a list of APs, to which each device may reach from respective geographic locations of record. Because the lower eight (8) bytes of the IPv6 address consist of the MAC address of the device, the traffic anomaly detector 160 may use an IPv6 address in order to validate whether or not a device is operating within an expected subnet. By use of IPv6 address, the traffic anomaly detector 160 may further detect traffic anomalies in a domain name service (DNS) registration, either during the device name registration process or as a periodical scan of the DNS database to identify network prefixes that are not within the whitelist of the device.

FIG. 7 depicts a second anomaly example 700 in which a device has been cloned, in accordance with one or more embodiment of the present invention.

In the base network 410 of FIG. 4B, the device d102 is located outside of the RF coverage 411 for the subject device d0. The second anomaly example 700 presents a scenario where the device d102 has been cloned into another device d102' 713 within the RF coverage for the subject device d0 without moving the device d102. Accordingly, the subject device d0 begins communicating with the cloned device d102' 713, and the traffic anomaly detector 160 checks d0-d102' traffic. Because the cloned device d102' 713 is identical to the device 102 except the MAC address d102', the cloned device d102' 713 may be properly authenticated with a central authentication server that does not use the MAC address.

As the device d102' 713 does not have an entry in the whitelist of the subject device d0, the traffic anomaly detector 160 detects the d0-d102' traffic as anomalous in block 530 of FIG. 5, and in block 590, flags the d0-d102' traffic and stores the d0-d102' traffic in the ADB 170. Further, the device d102' 713 may raise more than one alarm or record more than one anomalous traffic, because, when the traffic anomaly detector 160 runs for devices d1, d2, d3, and d4, respective whitelists of the devices d1, d2, d3, and d4 do not have any entry for the device d102' 713.

The second anomaly example 700 indicating a cloned device may be observed as the device communicating with several devices of which whitelists do not have any entry for the device as well as communicating with one or more devices of which whitelists have respective entries for the device. The second anomaly example 700 may be detected for both the original device and the cloned device placed in the FAN.

FIG. 8 depicts a third anomaly example 800 in which a MAC address of a device has been spoofed, in accordance with one or more embodiment of the present invention.

The third anomaly example 800 presents a scenario where the device d2 813 has been spoofed within the RF coverage for the subject device d0. The device d2 is originally within the RF coverage 411 of the base network 410 of FIG. 4B. The device d2 813 is infected by malware and is running a distributed denial-of-service (DDoS) attack in concert with other infected devices on a backend FAN/SCADA/IT device, and as a result, the device d2 813 uses numerous spoofed MAC addresses. The infected device d2 813 may keep the traffic volume low, switch amongst many spoofed MAC addresses, etc., to avoid detection. When the traffic anomaly detector 160 checks d0-d102 traffic, the whitelist of the subject device d0 has an entry for the device d2 813, only for the original MAC address of the device d2 from the base network 410. The traffic anomaly detector 160 detects that the device d2 813 as being spoofed from other traffic wherein the spoofed MAC address is not in the whitelist of another device.

The third anomaly example 800 indicating the MAC address spoofing may be observed as several devices having some MAC addresses that do not appear in whitelists of other devices in the FAN communicating with other close devices in the FAN.

Certain embodiments of the present invention may be utilized in detecting traffic anomaly in Layer 2 traffic, and in communications using identification derived from MAC addresses, in order to secure network boundaries and to secure devices of the network.

Figure 9:
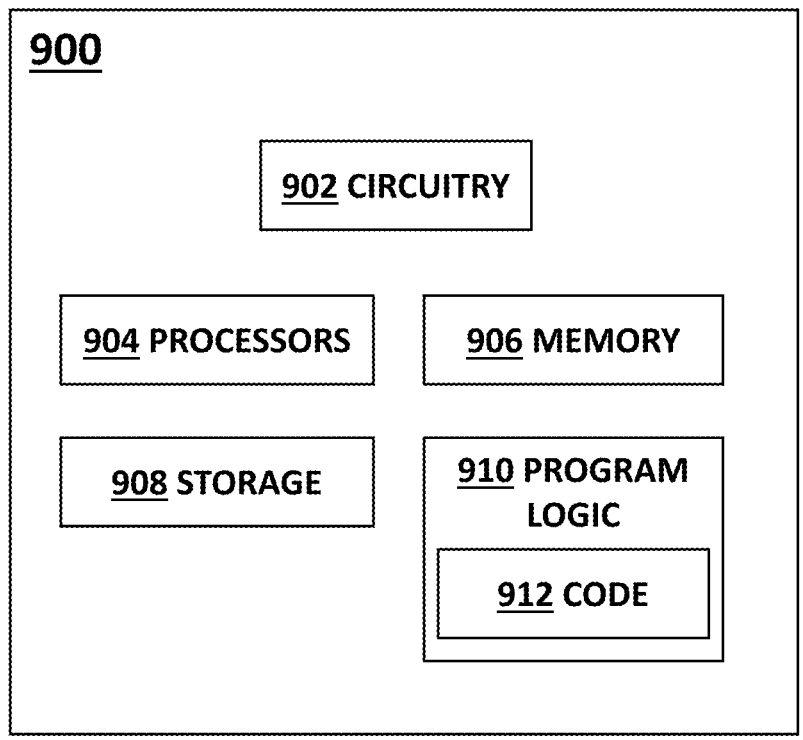
FIG. 9 depicts a computer system configured to perform aspects of one or more embodiment of the present invention.
Figure 10:
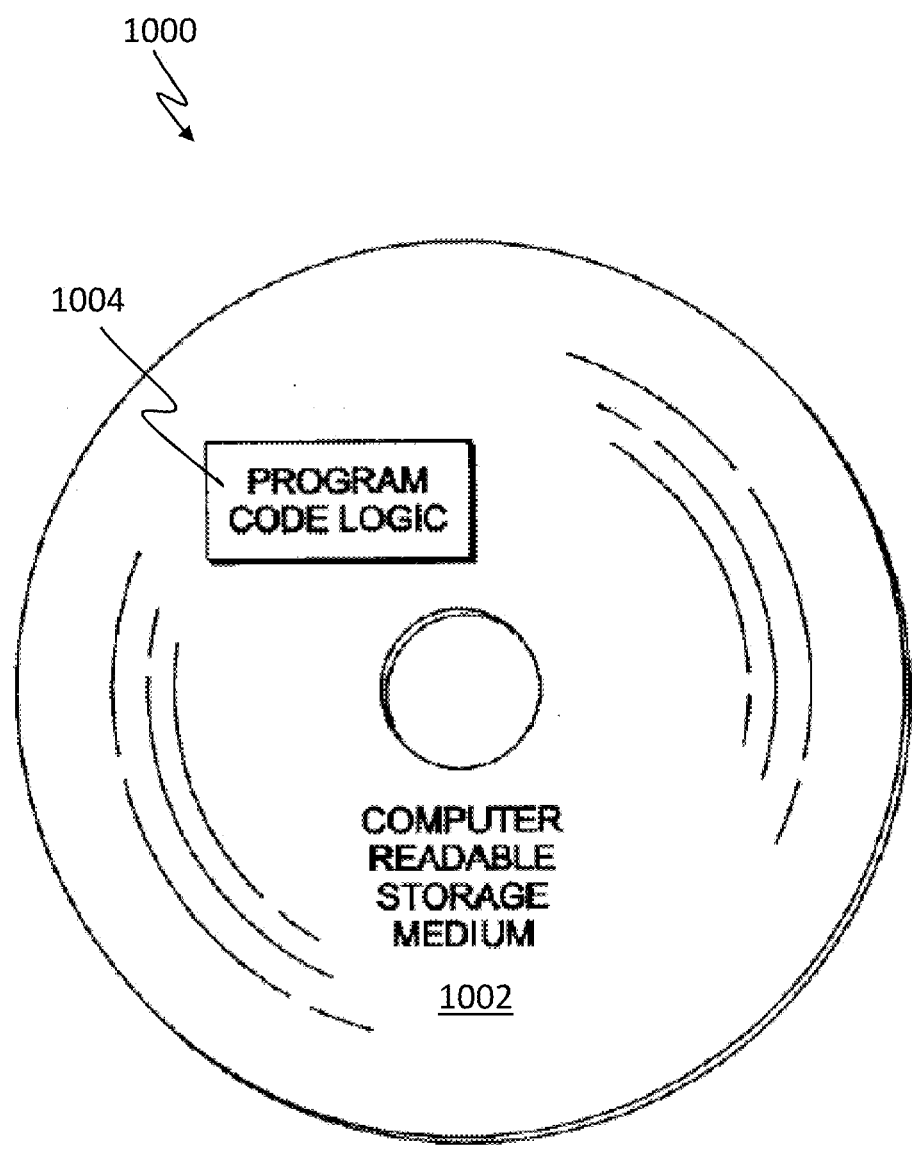
FIG. 10 depicts a computer program product incorporating aspects of one or more embodiment of the present invention.

FIGS. 9 and 10 are relevant to systems and methods discussed in this disclosure. FIG. 9 illustrates a block diagram of a resource 900 representing a computing apparatus that may be employed in implementing components of the system 100 of FIG. 1, such as the whitelist generator 120, the traffic anomaly detector 160, etc., in certain embodiments of the present invention.

Returning to FIG. 9, the resource 900 may include a circuitry 902 that may in certain embodiments include a processor 904. The resource 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The resource 900 may include a program logic 910 including code 912 that may be loaded into the memory 906 and executed by the processor 904 or circuitry 902.

In certain embodiments, the program logic 910 including the code 512 may be stored in the storage 908, or memory 906. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902. The program logic 910 may include the program code discussed in this disclosure that facilitates the traffic anomaly detection of a FAN in accordance with the embodiments of the present invention.

Using the processing resources of the resource 900 to execute software, computer-readable code or instructions, does not limit where this code can be stored.

Referring to FIG. 10, in one example, a computer program product 1000 includes, for instance, one or more non-transitory computer readable storage medium 1002 to store computer readable program code logic 1004 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Python, Smalltalk, C++ or the like, and conventional procedural programming languages, such as the "C" programming language, PHP, ASP, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

What is claimed is:

1. A computer implemented method comprising:
   generating, by one or more processor, a whitelist for a subject device from two or more devices in a field area network (FAN) listing one or more peer devices in the same FAN communicating with the subject device as respective whitelist entries, wherein the one or more peer devices indicate all other devices than the subject device from the two or more devices in the FAN, wherein the FAN is for an infrastructure without a controlled perimeter, and wherein a whitelist entry in the whitelist for the subject device corresponds to a peer device of the one or more peer devices in the FAN and comprises one or more attribute values expected in traffic between the subject device and the peer device as represented by the whitelist entry; and
   monitoring the traffic at one or more points of the FAN by use of the whitelist for one or more anomaly.

2. The computer implemented method of claim 1, the generating comprising:
   determining a first set of devices that are physically communicable with the subject device in the FAN;
   determining a second set of devices that communicates with the subject device based on communication policies and applications of the subject device;
   determining devices in an intersection of the first set and the second set as respective objective device corresponding to each whitelist entry in the whitelist for the subject device; and
   storing the whitelist for the subject device in a whitelist database, wherein the one or more attribute values expected from the traffic between the subject device and the respective objective device in respective whitelist entry include a directionality of the traffic, a periodicity of the traffic, a type of the traffic, and a volume of the traffic.

3. The computer implemented method of claim 1, further comprising:
   ascertaining, prior to the generating, that the whitelist is to be updated based on one or more of: a change in contents of device applications and policies database, a change in contents of a device geolocation and coverage database, and a change in status of a device in the FAN, as caused by installing a new application in the device, by implementing a new policy for the device, by retiring the device, replacing the device with another device, and/or redeploying the device to a new location in the FAN.

4. The computer implemented method of claim 1, the monitoring comprising:
   obtaining traffic data between the subject device and another device;
   determining that the another device does not have a corresponding whitelist entry in the whitelist for the subject device and that whitelist entries corresponding to the another device in other devices of the same FAN are inconsistent; and storing the traffic data with a flag indicating an anomaly of the one or more anomaly in the traffic data in an alert database for warning and further analysis of the anomaly.

5. The computer implemented method of claim 1, wherein the one or more anomaly includes a device tampering, a device malfunction, a movement of a device in relation to the FAN, a cloned device, a Medium Access Control (MAC) address spoofing, and a cross-network traffic.

6. The computer implemented method of claim 1, further comprising:

obtaining traffic data between the subject device and another device;

determining that the another device has a corresponding whitelist entry in the whitelist for the subject device;

discovering one or more discrepancy between the expected attribute values of the corresponding whitelist entry and the obtained traffic data, wherein the one or more discrepancy is greater than respective thresholds of acceptable variation with the expected attribute values; and storing the traffic data with a flag indicating an anomaly of the traffic data in an alert database for warning and further analysis.

7. The computer implemented method of claim 1, wherein the FAN is a radio frequency (RF) network covering one or more geographical area, wherein other field area networks are present in respective geographical areas which overlap, share borders, and/or within close proximity to the one or more geographical area covered by the FAN, and wherein each subject device in the FAN is associated with a respective whitelist including whitelist entries corresponding to other peer devices in the FAN with which the respective subject device legitimately communicates.

8. A non-transitory computer program product comprising: a computer readable storage medium readable by one or more processor and storing instructions for execution by the one or more processor for performing a method comprising:

generating a whitelist for a subject device from two or more devices in a field area network (FAN) listing one or more peer devices in the same FAN communicating with the subject device as respective whitelist entries, wherein the one or more peer devices indicate all other devices than the subject device from the two or more devices in the FAN, wherein the FAN is for an infrastructure without a controlled perimeter, and wherein a whitelist entry in the whitelist for the subject device corresponds to a peer device of the one or more peer devices in the FAN and comprises one or more attribute values expected in traffic between the subject device and the peer device as represented by the whitelist entry; and monitoring the traffic at one or more points of the FAN by use of the whitelist for one or more anomaly.

9. The computer program product of claim 8, the generating comprising:

determining a first set of devices that are physically communicable with the subject device in the FAN;

determining a second set of devices that communicates with the subject device based on communication policies and applications of the subject device;

determining devices in an intersection of the first set and the second set as respective objective device corresponding to each whitelist entry in the whitelist for the subject device; and storing the whitelist for the subject device in a whitelist database, wherein the one or more attribute values expected from the traffic between the subject device and the respective objective device in respective whitelist entry include a directionality of the traffic, a periodicity of the traffic, a type of the traffic, and a volume of the traffic.

10. The computer program product of claim 8, further comprising:

ascertaining, prior to the generating, that the whitelist is to be updated based on one or more of: a change in contents of device applications and policies database, a change in contents of a device geolocation and coverage database, and a change in status of a device in the FAN, as caused by installing a new application in the device, by implementing a new policy for the device, by retiring the device, replacing the device with another device, and/or redeploying the device to a new location in the FAN.

11. The computer program product of claim 8, the monitoring comprising:

obtaining traffic data between the subject device and another device;

determining that the another device does not have a corresponding whitelist entry in the whitelist for the subject device and that whitelist entries corresponding to the another device in other devices of the same FAN are inconsistent; and storing the traffic data with a flag indicating an anomaly of the one or more anomaly in the traffic data in an alert database for warning and further analysis of the anomaly.

12. The computer program product of claim 8, wherein the one or more anomaly includes a device tampering, a device malfunction, a movement of a device in relation to the FAN, a cloned device, a Medium Access Control (MAC) address spoofing, and a cross-network traffic.

13. The computer program product of claim 8, further comprising:

obtaining traffic data between the subject device and another device;

determining that the another device has a corresponding whitelist entry in the whitelist for the subject device;

discovering one or more discrepancy between the expected attribute values of the corresponding whitelist entry and the obtained traffic data, wherein the one or more discrepancy is greater than respective thresholds of acceptable variation with the expected attribute values; and storing the traffic data with a flag indicating an anomaly of the traffic data in an alert database for warning and further analysis.

14. The computer program product of claim 8, wherein the FAN is a radio frequency (RF) network covering one or more geographical area, wherein other field area networks are present in respective geographical areas which overlap, share borders, and/or within close proximity to the one or more geographical area covered by the FAN, and wherein each subject device in the FAN is associated with a respective whitelist including whitelist entries corresponding to other peer devices in the FAN with which the respective subject device legitimately communicates.

15. A system comprising:

a memory;
one or more processor in communication with the memory; and
program instructions executable by the one or more processor via the memory to perform a method comprising:
generating a whitelist for a subject device from two or more devices in a field area network (FAN) listing one or more peer devices in the same FAN communicating with the subject device as respective whitelist entries, wherein the one or more peer devices indicate all other devices than the subject device from the two or more devices in the FAN, wherein the FAN is for an infrastructure without a controlled perimeter, and wherein a whitelist entry in the whitelist for the subject device corresponds to a peer device of the one or more peer devices in the FAN and comprises one or more attribute values expected in traffic between the subject device and the peer device as represented by the whitelist entry; and
monitoring the traffic at one or more points of the FAN by use of the whitelist for one or more anomaly.

16. The system of claim 15, the generating comprising:
determining a first set of devices that are physically communicable with the subject device in the FAN;
determining a second set of devices that communicates with the subject device based on communication policies and applications of the subject device;
determining devices in an intersection of the first set and the second set as respective objective device corresponding to each whitelist entry in the whitelist for the subject device; and
storing the whitelist for the subject device in a whitelist database, wherein the one or more attribute values expected from the traffic between the subject device and the respective objective device in respective whitelist entry include a directionality of the traffic, a periodicity of the traffic, a type of the traffic, and a volume of the traffic.

17. The system of claim 15, further comprising:
ascertaining, prior to the generating, that the whitelist is to be updated based on one or more of: a change in contents of device applications and policies database, a change in contents of a device geolocation and coverage database, and a change in status of a device in the FAN, as caused by installing a new application in the device, by implementing a new policy for the device, by retiring the device, replacing the device with another device, and/or redeploying the device to a new location in the FAN.

18. The system of claim 15, the monitoring comprising:
obtaining traffic data between the subject device and another device;
determining that the another device does not have a corresponding whitelist entry in the whitelist for the subject device and that whitelist entries corresponding to the another device in other devices of the same FAN are inconsistent; and
storing the traffic data with a flag indicating an anomaly of the one or more anomaly in the traffic data in an alert database for warning and further analysis of the anomaly.

19. The system of claim 15, wherein the one or more anomaly includes a device tampering, a device malfunction, a movement of a device in relation to the FAN, a cloned device, a Medium Access Control (MAC) address spoofing, and a cross-network traffic.

20. The system of claim 15, further comprising:
obtaining traffic data between the subject device and another device;
determining that the another device has a corresponding whitelist entry in the whitelist for the subject device;
discovering one or more discrepancy between the expected attribute values of the corresponding whitelist entry and the obtained traffic data, wherein the one or more discrepancy is greater than respective thresholds of acceptable variation with the expected attribute values; and
storing the traffic data with a flag indicating an anomaly of the traffic data in an alert database for warning and further analysis.

* * * * *